United States Patent
Wassermann et al.

(10) Patent No.: US 12,188,558 B2
(45) Date of Patent: Jan. 7, 2025

(54) LOCKING UNIT

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE)

( * ) Notice: Subject to any disclaimer, the term of this patent is extended or adjusted under 35 U.S.C. 154(b) by 0 days.

(21) Appl. No.: 18/313,056

(22) Filed: May 5, 2023

(65) Prior Publication Data

US 2023/0358311 A1    Nov. 9, 2023

(30) Foreign Application Priority Data

May 5, 2022 (DE) .......................... 102022111233.0

(51) Int. Cl.
*F15B 15/26* (2006.01)
*F16H 63/34* (2006.01)

(52) U.S. Cl.
CPC ......... *F16H 63/3483* (2013.01); *F15B 15/26* (2013.01)

(58) Field of Classification Search
CPC ............. F16H 63/3441; F16H 63/3491; F16H 63/3483; F15B 15/261; F15B 15/26; F15B 2211/72
See application file for complete search history.

(56) References Cited

U.S. PATENT DOCUMENTS

| | | | | |
|---|---|---|---|---|
| 7,650,828 B2* | 1/2010 | Rau | ...................... | F15B 15/2861 92/5 R |
| 10,139,247 B2* | 11/2018 | Yamagishi | ............. | G01D 5/145 |
| 11,280,408 B2* | 3/2022 | Mang | .................. | F16H 63/3416 |

FOREIGN PATENT DOCUMENTS

| | | |
|---|---|---|
| DE | 10102960 A1 | 8/2002 |
| DE | 102008029267 A1 | 12/2009 |
| DE | 102017105319 A1 | 9/2017 |
| DE | 102020115045 A1 | 12/2021 |

OTHER PUBLICATIONS

Foreign Communication for German Patent Application No. 102022111233.0, German Search Report, 5 pages.

\* cited by examiner

*Primary Examiner* — Kenneth Bomberg
*Assistant Examiner* — Daniel S Collins
(74) *Attorney, Agent, or Firm* — Scheef & Stone, L.L.P.; Keith C. Rawlins

(57) ABSTRACT

A locking unit for locking the movement of a piston which can be acted on with pressure of a fluid, the locking unit having the piston, an electromagnet, and at least one detent element. The detent element interacts with an armature or an armature rod of the electromagnet. The piston has at least one detent receptacle, and the piston can be secured by a retaining interaction of the detent element with the detent receptacle. The piston is adjustable between a retracted position and an extended position, and the piston can be designed at least in sections as a hollow part.

18 Claims, 10 Drawing Sheets

LOCKING UNIT

CROSS-REFERENCE TO RELATED APPLICATIONS

This non-provisional patent application claims the benefit of, and priority to, German Application No. 10 2022 111 233.0, entitled Locking Unit, filed on May 5, 2022, which is incorporated by reference in its entirety.

FIELD OF THE DISCLOSURE

The present disclosure generally relates to a locking unit, and more particularly to locking units for automatic transmissions.

BACKGROUND

Locking units are used, for example, for automatic transmissions of motor vehicles which are locked when parked. Locking units of this type are typically designed in such a manner that, depending on the shift position, the parking lock is or is locked or is not locked in different positions. For this purpose, use can be made, for example, of a piston which can be moved in particular hydraulically and can be locked electromechanically.

However, such a locking unit sometimes has high production costs and/or components of complex configuration, the production of which results in high costs.

SUMMARY

Disclosed is a locking unit for locking a movement of a piston which can be acted on with pressure of a fluid, the locking unit including: the piston; an electromagnet; and at least one detent element, wherein the detent element interacts with an armature or an armature rod of the electromagnet, wherein the piston has at least one detent receptacle, wherein the piston can be secured by a retaining interaction of the detent element with the detent receptacle, wherein the piston is adjustable between a retracted position and an extended position, wherein the piston is designed at least in sections as a hollow part.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
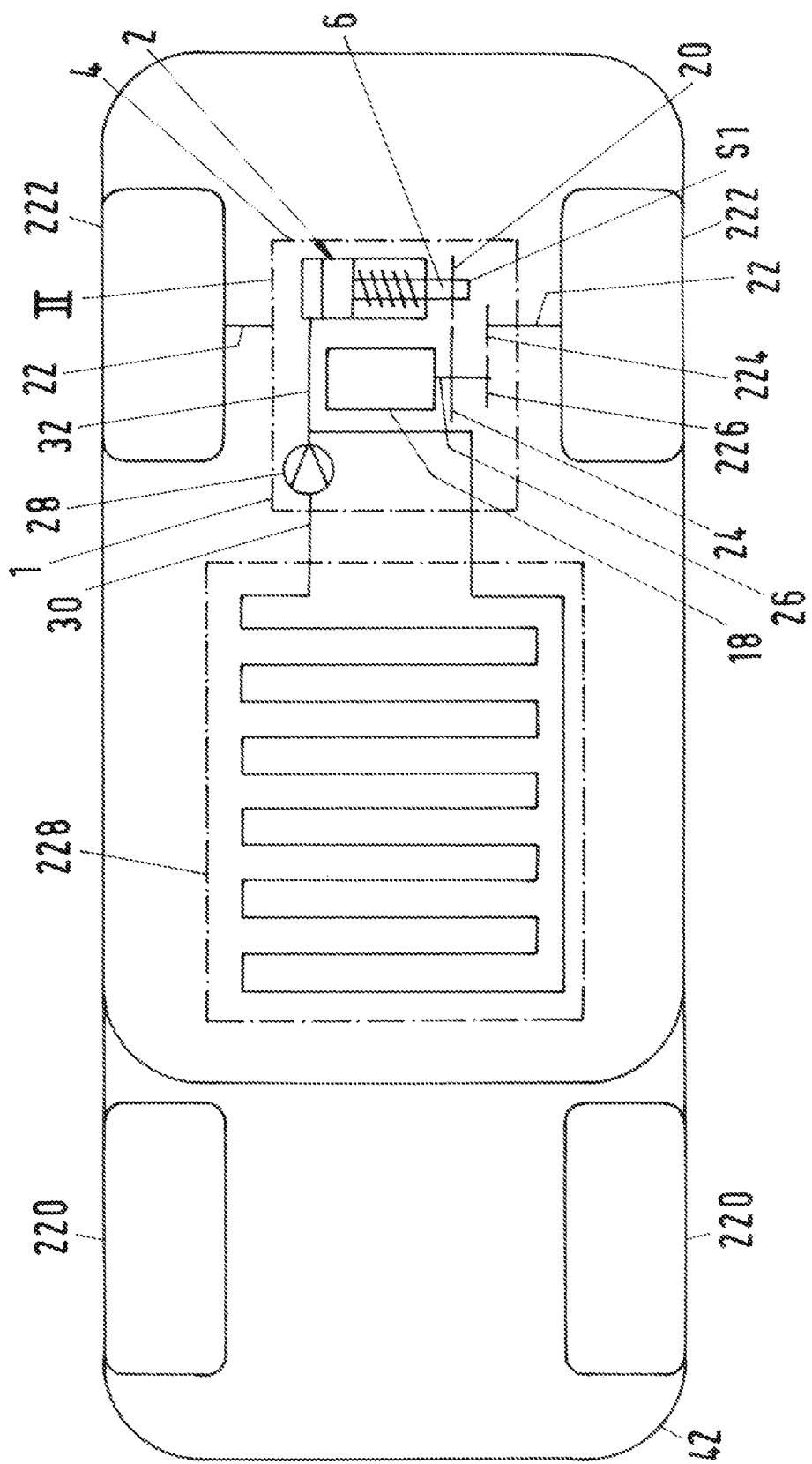
FIG. 1 shows a schematic view of a vehicle with a locking arrangement.

Disclosed is a locking unit comprising a piston and serving for locking the movement of the piston which can be acted on with pressure of a fluid, wherein the locking unit has an electromagnet and at least one detent element, and the detent element interacts with the armature or the armature rod of the electromagnet, and the piston has at least one detent receptacle, and the piston can be secured by the retaining interaction of the detent element with the detent receptacle, wherein the piston is adjustable between a retracted position and an extended position, wherein the piston is designed at least in sections as a hollow part.

Pistons may sometimes be configured as a solid material part. The piston in the form of a hollow part can provide significantly more favorable production, with it being possible at the same time to reduce the weight of the piston. As a result, the weight of the locking unit as a whole is reduced. This is associated with protection of resources and also saving on construction space since components can now be provided within the piston.

In aspects, the piston can be designed at least in sections as a punched and rolled part. During the punching and rolling process, first of all a blank is punched out of a metal sheet in a first step. The blank is subsequently formed or rolled in a second step in such a manner that a hollow body, for example a hollow cylinder, is produced. The initially mutually averted edges of the punched-out blank can lie opposite one another and can even lie against one another after the rolling process. Compared to other methods, for example pressing or compressive rolling or deep drawing, in each case according to DIN 8584, this method firstly has the disadvantage of involving two steps (punching and rolling). In addition, it has the disadvantage that only very simple geometries can be rolled, compared to, for example, roll forming or deep drawing. However, it is precisely therein that the previously unrecognized advantage of punching and rolling lies. Owing to the punched and rolled part being of such a simple design, it can be produced, as it were, very cost-effectively.

However, the two-stage operation opens up a further possibility of reducing costs. While, namely, recesses can only be made in a highly complicated and costly way on the existing hollow body of components by pressing or compressive rolling or deep drawing, with the punching and rolling process the desired cut out can already be introduced prior to forming (rolling). Complicated transverse operations are therefore not necessary at all.

The use of punching and rolling is also visible at the component. The absence, enabled by the punching and rolling, of mechanical production marks (streaks or grooves) on the punched and rolled part can be immediately visually checked. It has therefore been surprisingly recognized that punching and rolling in the technical context of safety-relevant locking units is suitable for reducing production costs while simultaneously maintaining quality.

The piston rod can be an assembly and comprise a piston tube and a piston thrust piece, which can be produced separately from the latter. Both can be designed as hollow bodies. The punched and rolled part can be a part or section of the piston tube in order to connect elements, which can be moved or held by the piston, thereto for their mechanical adjustment. The punched and rolled part on the piston tube can form a section thereof and may be referred to as punched and rolled section. In principle, the punched and rolled part can serve to transmit the hydraulic force and locking effect to a follow-up mechanism.

In aspects, the punched and rolled part can receive at least one recess and/or at least one through opening. A fastening bolt can be arranged in the at least one through opening. A follow-up mechanism can engage on said fastening bolt. In addition, the recess can serve such that the follow-up mechanism can engage in the interior of the punched and rolled part and can engage on the fastening bolt.

In aspects, the at least one recess can be enclosed on both sides in the longitudinal direction by an annular section of the punched and rolled part. As a result, a more stable design can be achieved than with an open fork head.

In aspects, the punched and rolled part can be a hollow cylinder. The hollow cylinder can have a constant diameter over its longitudinal extent, this likewise serving to reduce costs.

In aspects, the punched and rolled part can be arranged partially or completely outside a housing of the locking unit in each of the two positions of the piston. As a result, the punched and rolled part can realize as short a longitudinal extent as possible and low production costs.

In aspects, the punched and rolled section can be hard brazed or welded on the piston or on a tube middle piece of the piston, for example, by laser welding. Although the multi-part production of the piston tube leads to the individual parts then having to be connected to form a piston tube, the advantages of the punched and rolled part outweigh the disadvantages of the explicit connection. Laser welding permits the production of two different parts which can thereby be manufactured more cost-effectively overall. For example, a single-part design of the piston tube as a deep drawn part appears to be able to be scarcely produced, or only with very great complexity, because of high degrees of forming, but at least not more cost-effectively.

In aspects, the at least one tube middle piece can be a deep drawn part. In the case of a tube middle piece as a deep drawn part, relatively complex contours of the piston can be realized in one processing step. Specifically in combination with the punched and rolled part, an overall highly functional, but nevertheless cost-effective piston tube is produced here.

In aspects, the interconnected edges of the punched and rolled section can have a form fit, such as a puzzle closure. As a result, the form-fitting geometries can already be formed cost-effectively on the edges during the punching.

In aspects, after the rolling and production of the form fit, the form-fitting geometries can also be calked or locally plastically deformed with a forming tool. This makes it possible to remove play caused by manufacturing tolerances from the form fit.

In aspects, the housing of the locking unit can have or form a meandering fluid channel which is fluidically connected to a pressure chamber of the locking unit. A fluid channel having a plurality of turns and a corresponding length should therefore be provided over a conveniently small area. Up to now, housings merely have a connection bore to which surrounding systems have to be adapted. However, if said connection bore has to be located differently on the housing, this may lead to high reconfiguration costs or may sometimes not even be possible. The meandering fluid channel can be covered by a cover. A connection bore can then be provided in the cover, with any point along the meandering fluid channel being possible for the location of the connection bore. As a result, a highly variable adaptation to customer requirements with an unvarying housing is possible. This leads to considerably lower costs since at most a cover has to be newly configured, rather than the entire locking unit.

In addition, the meandering fluid channel can be formed integrally with the housing, for example, as a plastics injection molded part, with it being possible for this purpose for a simple "on/off" tool to be used, which likewise contributes to reducing costs.

The fact that the conducting of the fluid entry as far as the optimum entry point on the piston can be avoided without replacement also reduces costs. Another factor reducing costs on the customer system side is the guiding to the optimum fluid transfer point, in the case of a simplified channel system in the housing, or saving on an intermediate plane in the pressure distribution system.

In aspects, the meandering fluid channel can run at least on and/or along a housing side. The meandering fluid channel can thereby be arranged in one plane and a cover can be configured with as little complexity as possible.

In aspects, the housing can have a cover which covers the meandering fluid channel and has a fluid opening which opens into the meandering fluid channel. This is based on the basic concept that a component to be provided for respective adaptations can be configured as cost-effectively as possible in order to reduce the overall costs. With such a cover, customers now have many possibilities for fixing a dedicated fluid transfer point without the housing also having to be changed for this purpose. The cover is therefore the sole part which has to be individually manufactured. The meandering fluid channel provides a multiplicity of fluid transfer points. Moreover, it is even possible, in the case of an existing locking unit, to simply change a fluid transfer point easily and cost-effectively by a different cover being provided. As a result, the combination of meandering fluid channel and cover realizes the advantages of a modular design.

In aspects, the housing can have a separating plane in which the meandering fluid channel, and in some aspects, also a meandering seal, is arranged. By the separating plane, the housing can be open along the meandering fluid channel and can also be produced in open form and delivered to a customer. An adjacent component can then be suitably configured by the customer. The cover can thereby simply be a plate, without any depth extent. A cost-effective, but highly effective seal and an extremely cost-effective cover is therefore realized.

In aspects, a magnetic element (piston target) can be connected to the piston, and at least one magnetic field sensor (piston sensor) can be arranged on or in the housing for sensing a magnetic field of the magnetic element. The magnetic element is therefore adjustable together with the piston in the longitudinal direction. The locking unit can comprise a piston sensor system for sensing the position of the magnetic element and therefore also of the piston. It is not only possible to lock the piston, but also to obtain feedback in a simple manner as to the position in which the piston is actually in. Finally, the position of the piston determines whether the vehicle can be moved inadvertently or whether the locking unit reliably prevents an inadvertent movement. A cost-effective and reliable source of information regarding the position of the piston is provided by such a piston sensor system.

The at least one magnetic field sensor can be a Hall sensor. By coupling of the magnetic element to the piston, the magnetic element basically moves together with the piston. Its position can be sensed by the at least one magnetic field sensor. In aspects, it can be recognized on the basis of a magnetic field strength or the angle of the magnetic field lines at which they penetrate the magnetic field sensor how close the magnetic element is to the magnetic field sensor concerned or whether it may be shielded by other components. In some aspects, the magnetic element can be a permanent magnet, for example a magnetized hard ferrite.

In aspects, the magnetic element can be surrounded and optionally insert molded, by a plastics carrier. This enables separate, cost-effective production permitting simple installation. The plastics carrier can be, for example, a plastics ring which is plugged or pressed onto the piston.

In aspects, the magnetic element can be arranged on the outer circumferential side of the piston (e.g., on the tube middle piece of the piston). In additional aspects, the magnetic element can be arranged in an axial end region of the piston tube. The outer circumferential side arrangement serves not only the conscious exposure for reliable sensing (better signal than arrangement in a metallic piston) by the magnetic field sensor(s), but also for supporting the piston. The magnetic element itself or the plastics carrier thereof can namely have, on the outer circumferential side, a supporting surface which is guided on an inner circumferential surface, for example on an inner wall of the tube piece. The arrangement in the axial end region of the piston tube results in as deep an arrangement as possible of the magnetic element in the locking unit. As a result, cables can be shorter, the sensor system can be constructed more compactly and configured more cost-effectively.

In aspects, the at least one magnetic field sensor can be arranged in a fluid opening, for example, in a pressure relief port, of the housing. As a result, as short a distance as possible from the magnetic element can be produced, for example, if it is arranged on the outer circumferential side of the piston. The fluid opening can lead to a tank or transmission oil sump.

In aspects, a control element which, depending on the position, presses the detent elements radially outward, can be connected to an armature or an armature rod of the electromagnet, wherein a further magnetic element (control element target) can be connected to the control element, and a further magnetic field sensor (control element sensor) for sensing a magnetic field of the further magnetic element can be arranged in the locking unit. The further magnetic element is therefore adjustable together with the control element in the longitudinal direction. The locking unit can comprise a control element sensor system for sensing the position of the further magnetic element and therefore also of the control element. Specifically with the combination of piston sensor system and control element sensor system, it is not only possible for the respective position of the sensed component to be reliably sensed, but a plausibility comparison regarding the state of the locking unit can be made. The piston sensor system can determine, for example, the states "piston retracted" and "piston extended", with it being possible for the control element sensor system to determine the states "detent elements released" and "detent elements blocked". It is conceivable for the piston in the retracted position to prevent rolling of the vehicle and in the extended position to permit rolling of the vehicle. Although a theoretical state "piston retracted" and "detent elements released" can initially indicate that rolling of the vehicle is prevented since the piston is sensed in the retracted position, this position is not permanently fixed since the detent elements are released. A functionality test can then also take place.

In aspects, the piston or at least the tube middle piece(s) thereof can be formed from a ferromagnetic material. This can be expedient if the magnetic element of the piston sensor system is located on the outer circumferential side of the piston and a control element sensor system is not provided within the piston. Ferromagnetic material is also weldable in a simple manner, in respect of the punched and rolled part.

In aspects, the piston or at least the tube middle piece(s) thereof can be formed from a nonferromagnetic material. This can be advantageous if the magnetic element of the control element sensor system is arranged in the piston. The propagation of the magnetic field and therefore the measurement are only obstructed or interfered with a little, if at all, by the piston in this case.

In aspects, a leadframe can be included which carries the at least one magnetic field sensor and/or is surrounded or insert molded by a plastic. Leadframes are printed circuit boards which are severed from a material by a punching tool in order thus to avoid any excess printed circuit board surface. The advantage of the leadframe is that three-dimensional structures can be permitted here, which is not possible using a simple printed circuit board. A further advantage relating to costs is that the connection technology can be directly integrated in the leadframe and, as a result, no additional electrical interface is required. An electrical interlinking can be undertaken here in an advantageous way, with it being possible for only one electronic interface to be provided. The surrounding plastic can be the housing of the locking unit or else also a housing which is separate therefrom, for example an electrical module housing.

In aspects, it can have an electrical module housing which is separate from, and fastened to the housing, and which has an electronic interface which is the sole electronic interface of the locking unit. Electric components of the locking unit can therefore be combined in the electrical module housing. Separate cables having a plurality of plugs are now not necessary. The electrical module housing can be a plastics injection molded part and can comprise, or comprises in insert molded fashion, the leadframe, one or more of the sensors, in particular the magnetic field sensors of the piston sensor system, a BUS system and an electronic interface. There is thus an increase in robustness because of a reduced number of interfaces, a reduction in costs because of fewer components, and a reduction in outlay on installation and risks of failure.

In aspects, it can comprise a BUS system to which one or more of the following components are connected: a solenoid valve, an electromagnet, and a magnetic field sensor. The electrical output signals from the sensors can ideally be provided via a BUS system (CAN, SENT). The BUS system permits a drastic reduction in strip conductors of the leadframe and therefore serves to reduce costs. The design of the wiring between the control devices connected to a BUS system is standard. In addition, the number of data lines required is significantly smaller.

In aspects, it can comprise an inner tube piece which is designed as a guide of the piston and which delimits a pressure chamber on the inner circumferential side and delimits a pressure-conducting channel on the outer circumferential side and delimits an outlet channel on the outer circumferential side. Particularly good guidance of the piston is achieved by the guidance on the tube piece, and therefore the piston can be moved as smoothly as possible. The pressure-conducting channel can conduct fluid into the pressure chamber and out of the latter. The outlet channel serves for conducting fluid out of the housing. In an advantageously cost-reducing way, the one tube piece forms a radial delimitation for three elements simultaneously, namely pressure chamber, pressure-conducting channel and outlet channel. It is conceivable for a valve, such as the nonreturn valve, which permits a fluid flow into the locking unit, to be arranged between pressure-conducting channel and outlet channel. Pressure-conducting channel and outlet channel can be fluidically connected by the nonreturn valve. On the inside means that the tube piece is arranged within the housing.

The pressure-conducting channel can be delimited at least partially radially, with respect to the longitudinal axis of the piston, on the inside by the outer side of the tube piece and on the outside by the inner wall of the housing. The tube piece can be connected to the housing or mounted there or can be part of the housing. In aspects, the piston lies against the tube piece. This permits particularly advantageous guidance of the piston along the tube piece. It can lie against it along an entire circumference. In aspects, the piston slides along the tube piece.

In aspects, the tube piece can have a rounded or flattened inner circumferential edge axially at one end on the inner circumferential side and/or a rounded or flattened outer circumferential edge axially at the other end. The rounded edge can be produced, for example, with a crimped border. By such geometries, the tube piece can be introduced in a simple and self-centering manner into the housing. It is conceivable for the corresponding inner circumferential edge to face the electromagnet or middle piece. Other components can also be introduced in turn in a simple and self-centering manner into the tube piece. In addition, these geometries prevent damage during the installation, and therefore also a reduction in costs and reduction in complexity.

In the figures, identical or mutually corresponding elements are denoted in each case by the same reference signs and will therefore not be described anew unless expedient. In order to avoid repetitions, features that have already been described will not be described again, and such features are applicable to all elements with the same or mutually corresponding reference designations unless this is explicitly ruled out. The disclosures in the description as a whole are transferable analogously to identical parts with the same reference signs or the same component designations. It is also the case that the positional indications used in the description, such as for example above/top, below/bottom, lateral, etc., relate to the figure presently being described and illustrated and, in the case of the position being changed, are to be transferred analogously to the new position. Furthermore, it is also possible for individual features or combinations of features from the different exemplary embodiments shown and described to constitute independent or inventive solutions or solutions according to the disclosure.

FIG. 1 depicts an electric vehicle 42 with a locking arrangement 1 according to the disclosure. The electric vehicle 42 merely shows the principle and also comprises two front wheels 220 and two rear wheels 222 which are driveable. For this purpose, at least one electric axle 4 is provided per rear wheel 222 or one electric axle for the two rear wheels 222. Front wheel drive or all wheel drive is alternatively also conceivable. Each of the rear wheels 222 has an axle 22 with a gearwheel 224 arranged thereon for conjoint rotation. The gearwheel 224 is engaged by a gearwheel 226 which is arranged on a shaft 26 of an electric motor 18 for conjoint rotation. The driving force of the electric motor can thus be transmitted to the rear wheel 222 or the rear wheels 222.

A gear 24 or gear wheel is likewise connected to the shaft 26 for conjoint rotation. Said gear 24 is engaged by a blocking gear 20. A piston 6 of a locking unit 2 or a follow-up mechanism can optionally engage in the blocking gear 20 in order to release or to prevent rotation of the blocking gear 20. In the position shown, the piston is shown in the retracted position S1 and a follow-up mechanism engages in a form-fitting manner in the blocking gear 20. A mechanical chain of effect is thus produced starting from the piston 6, specifically: piston 6—blocking gear 20—gear 24—shaft 26—gearwheel 226—gearwheel 224—axle 22—rear wheel 222 or the rear wheels 222. This chain of effect can also be configured differently or with fewer machine elements.

The locking arrangement 1 for the electric vehicle 42 therefore comprises the locking unit 2, the electric motor 18 and at least one axle 22 which can be driven by the electric motor 42. The locking unit 2 has the piston 6. It also serves for locking the movement of the piston 6 which can be acted on with pressure of a fluid. In the retracted position S1 shown, the piston 6 acts on the axle(s) 22 in such a manner that the rotation thereof is mechanically blocked.

The electric vehicle 42 also comprises a drive battery 228 and a coolant circuit 30 with a corresponding line. For circulating the fluid contained in the coolant circuit 30, a pump 28 is provided which has two operating directions or directions of rotation, namely suction and pressure. In addition, a line 32 is provided between pump 28 and locking unit 2 in order to act on the piston 6 with hydraulic pressure. The line 32 is connected to the coolant circuit 30, with fluid being able to be fed from the coolant circuit into the line.

Figure 2:
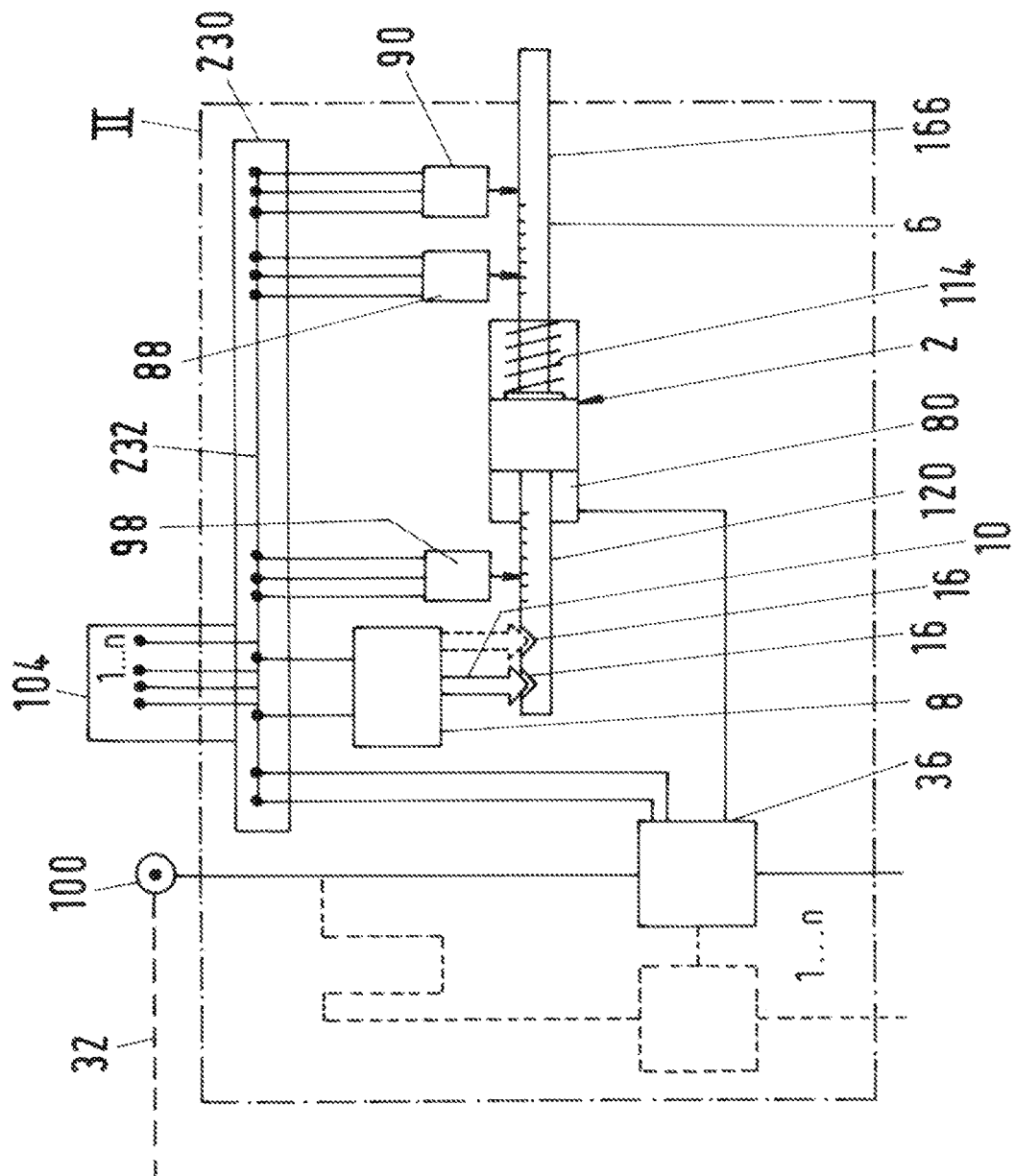
FIG. 2 shows a detail II according to FIG. 1.

FIG. 2 shows a detail II from FIG. 1, the detail II also being of a schematic character. From the detail II from FIG. 1, only the locking unit 2 is illustrated here. A fluid inlet 100 which can be an opening in a housing 40 of the locking unit 2 can be seen. The line 32 leads to the fluid inlet 100. The locking unit 2 from FIG. 2 also comprises a solenoid valve 36, with a nonreturn valve 43 or a plurality of valves also being conceivable. The valves regulate and control at least one fluid inlet and/or fluid outlet of the locking unit 2 for hydraulic pressurization of the piston 6. The fluid passes through the solenoid valve 36 and a pressure line network to a pressure chamber 80 in order to pressurize there the piston 6 to the right in the plane of the image and to bring it into the extended position S2. The piston 6 is pressurized by a restoring element, for example a piston spring 114, to the left in the plane of the image, in order to bring it into the retracted position S2. The respective piston position S1, S2 is electromechanically locked, with an electromagnet 8 and a detent unit 120 being used for this purpose. As will be described later in detail, the detent elements 10 can be latched in detent receptacles 16, 202, 204 or blocked there, as a result of which a longitudinal movement of the piston 6 is also blocked. The respective position of the detent unit 120 can be sensed by a magnetic field sensor 98. The respective position of the piston 6 or of the piston tube 166 can be sensed by at least one magnetic field sensor 88, with it also being possible for a further magnetic field sensor 90 to be provided for this purpose.

The locking unit 2 deftly comprises electrical interlinking 230 comprising a BUS system 232. The solenoid valve 36, the electromagnet 8 and the magnetic field sensors 88, 90 and 98 are connected to said BUS system in terms of signaling. In addition, a single plug or an electronic interface 104 is provided. All of the electronic components of the locking unit 2 can thus be supplied in terms of signaling via a single electronic interface 104.

Figure 3:
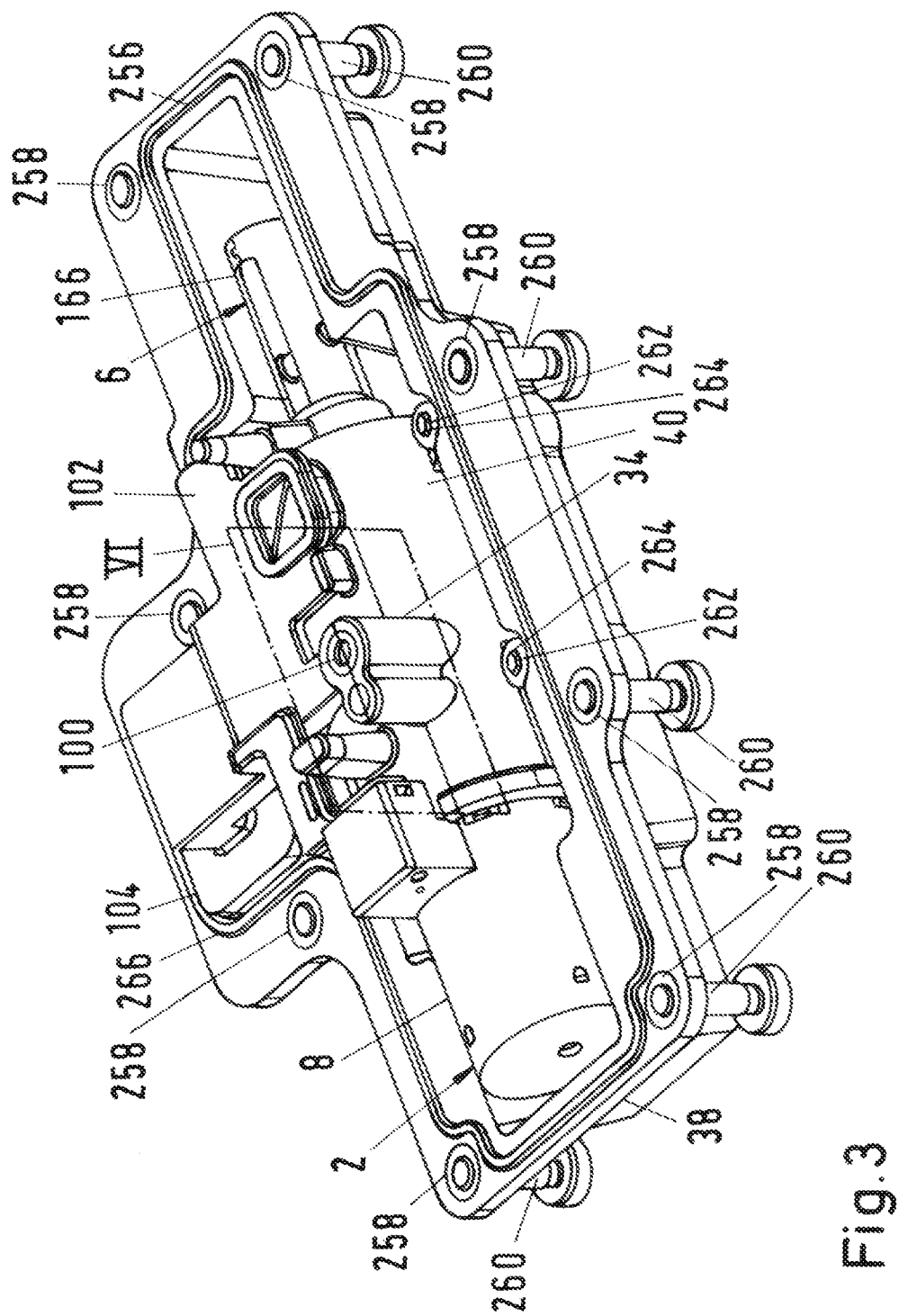
FIG. 3 shows a perspective view of a locking unit.

FIG. 3 shows a perspective view of a locking unit 2 according to the disclosure. The latter has a longitudinal direction L, a radial direction R and a circumferential direction U. It can be seen that it is arranged in an outer housing 38, of which only one of two shells is illustrated. The shell which is shown has a seal 256. The outer housing 38 has bores 258. Screws 260 reach through them to fasten said outer housing. The housing 40 of the locking unit 2 also has bores 262 through which screws 264 reach for fastening said housing in the outer housing 38. The outer housing 38 comprises merely three openings, namely a fluid opening (not illustrated), an electrical opening 266 and a mechanical opening (not illustrated). The electronic interface 104 protrudes through the electrical opening 266.

FIG. 3 also shows an electrical module housing 102 which is a housing separate from the housing 40 and comprises a leadframe on which at least one magnetic field sensor 88, 90 is arranged and which comprises a BUS system 232. The leadframe is insert molded by the plastic of the electrical module housing 102. The electronic interface 104 is formed by the electrical module housing 102.

Figure 4:
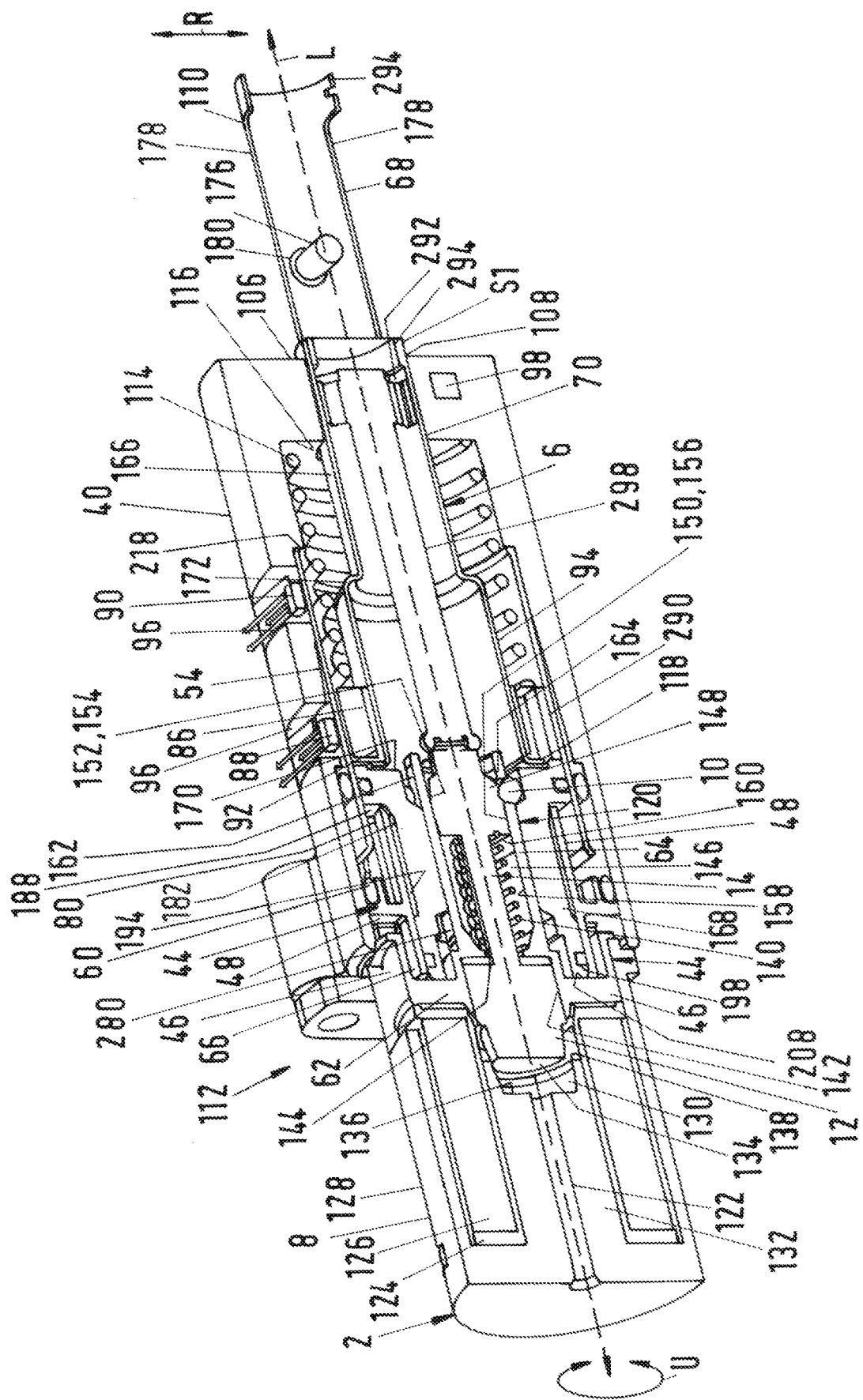
FIG. 4 shows a perspective sectional view through a locking unit in the retracted position.
Figure 5:
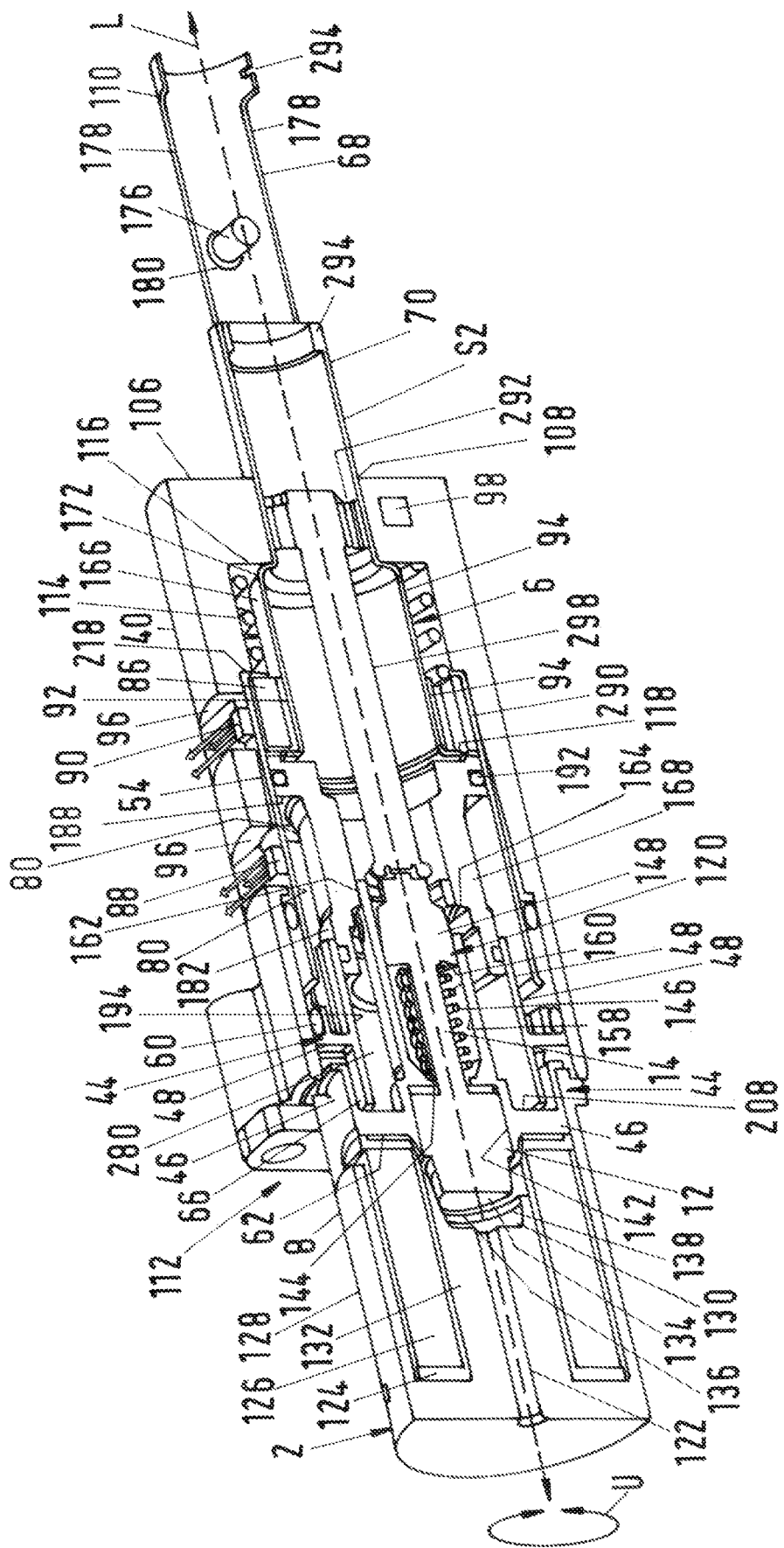
FIG. 5 shows a perspective sectional view through the locking unit of FIG. 4 in the extended position.

The locking unit 2 is described in more detail with regard to FIGS. 4 and 5.

FIG. 4 shows a perspective sectional view through a locking unit 2 in the retracted position S1.

The locking unit 2 has a housing 40, at the front housing end 106 of which there is provided an opening 108 out of which the front end 110 of the piston 6 projects. The piston 6 is designed as a hollow part. At the rear housing end 112 opposite the opening 108, an electromagnet 8 adjoins the housing 40 in the axial direction or longitudinal direction. Axial direction here means either the axis of symmetry or longitudinal axis L or else the direction of movement of the piston 6. In the housing 40, the piston 6 is mounted so as to be movable in the axial direction, for example, along the longitudinal axis L. In aspects, the piston 6 is at least partially mounted in a middle piece 44 which is at least partially surrounded by the housing 40, the middle piece 44 being formed in two parts from a metal part 46 and a plastics part 48. Here, a driver is provided for the movement of the piston 6, and the piston 6 can be acted on with pressure, such as a hydraulic pressure, where the force component of said pressure is directed counter to the direction of force of a piston spring 114. Here, the piston spring 114 is supported at one end on a shoulder 116, which adjoins the housing end 106 at the inside, or on a front face inner wall of the housing 40. At the other end, the piston spring 114 is supported on a flange ring 118 of the piston 6 or, as shown in this embodiment, on a magnetic element 86 or on a plastics carrier 92. Said flange ring 118 is situated in the interior, centrally in the housing 40.

The piston 6 moves, owing to the pressure, between multiple positions; in the variant shown here, two positions (retracted position S1, extended position S2) are provided by way of example in FIGS. 4 and 5. The situation of the piston 6 in the respective positions is fixable by a detent unit 120 which is equipped with detent elements 10. The electromagnet 8, or the elements thereof, serve(s) for the actuation of the detent unit 120, in particular for the detent elements 10 thereof. The electromagnet 8 has a coil body 124 which bears a winding 126. Said winding 126 has a wire which can be flowed through by electrical current. The winding 126 is closed off radially to the outside (in relation to the longitudinal axis L) by a magnet housing 128. A magnetic field arises as a result of an electrical energization of the winding 126.

An armature space 130 is provided in the interior of the coil body 124, the armature space 130 in the present case filling approximately ⅔ of the interior space of the coil body 124. Here, the armature space 130 is oriented in the direction of the piston 6. The remaining region of the interior space of the coil body 124 is filled by a magnet core 132 which, as is customary, is composed of magnetically soft material, which guides the magnetic field lines in an effective manner. Merely for reasons of simple illustration, the magnet housing 128 and magnetic core 132 are illustrated here in one piece. In the armature space 130, there is situated an armature 12 which, in the exemplary embodiment shown here, is of cylindrical form in sections and of frustoconical form in sections and has a base surface 134 on the frustoconical section. A gap 138 can be formed between the base surface 134 and a terminating surface 136, which faces toward the armature space 130, of the magnet core 132.

When the winding 126 is not electrically energized, a magnet spring 140 pushes the armature 12 to the right (in relation to the plane of the image), such that the gap 138 has its maximum extent. If the winding 126 is electrically energized, it generates a magnetic field which pulls the armature 12 to the left (in relation to the plane of the image) counter to the force of the magnet spring 140, such that the gap 138 is closed or is virtually closed. The armature 12 bears an armature rod 14. Merely for reasons of simple illustration, the armature 12 and armature rod 14 are illustrated here in one piece. Here, the armature rod 14 is oriented concentrically with respect to the armature 12; armature 12 and armature rod 14 are mounted so as to be movable in the longitudinal direction L. The construction can be selected here such that the armature 12 has an axial bore that receives the armature rod 14. Here, the armature rod 14 projects beyond the armature 12 to one side of the latter. A central axial bore 122 is provided in the magnet core 132. Fluid can flow into the gap 138 through the bore 122 in order to permit rapid movement of the armature 12. This fluid can also be pushed out through the bore 122. Since the bore 122 does not bear an armature rod, it can be formed with a considerably smaller diameter, as a result of which costs and construction space are saved.

The armature space 130 is delimited on one side by the magnet core 132, wherein, as already described, the magnet core 132 fills that part of the interior space of the coil body 124 which is averted from the piston 6, and said magnet core 36 thus also describes the axial end of the electromagnet 8, but also of the locking unit 2, together with the magnet housing 128. On the other side, facing toward the piston 6, the armature space 130 is delimited by a yoke part 142 which can be formed from a magnetically soft material in order to guide the magnetic field lines in an effective manner. Here, a part of the armature 12 protrudes into the yoke part 142. The yoke part 142 here can be part of the detent unit 120 and/or of the electromagnet 8. The yoke part 142 or a middle piece 44 has a through bore 144 which receives and possibly also bears the armature rod 14.

Part of the detent unit 120 is a metal part 46 or the hollow cylinder section 64 thereof. The metal part 46 also has a cap section 62 which here forms the yoke part 142.

The two sections 62, 64 adjoin in each case one corresponding receiving space in the radial direction R. Here, the cap section 62 or the yoke part 142 delimits the armature space 130 and the hollow cylinder section 64 delimits an interior space 146. The interior space 146 extends here in the longitudinal direction L. The magnet spring 140 is also arranged in the interior space 146, said magnet spring being supported at one end on the cap section 62 or yoke part 142 and at the other end on a control element 148, which is arranged on the end side of the armature rod 14. Here, the control element 148 is arranged in a positionally fixed manner on the armature rod 14 and is arranged so as to be longitudinally displaceable together with it. Merely for reasons of simple illustration, the armature rod 14 and control element 148 are illustrated here in one piece. The control element 148 can have a central axial detent bore into which the armature rod 14 can be inserted. For example, the control element 148 can then be pressed together with the armature rod 14 in a suitable manner and thus held on the latter in a positionally accurate manner. The control element 148 is composed substantially of two different geometric bodies, a cylinder section 150 and a cone section 152, wherein the cone section 152, on its lateral surface, forms a cone surface 154. A lateral surface 156 of the cylinder section 150 of the control element 148 is guided and possibly also mounted on an interior space wall 158 which delimits the interior space 146 in the radial direction R. At that axial end of the control element 148 which faces toward the electromagnet 8, there is situated an annular front face 160 against which the one end of the magnet spring 140 lies and is thus reliably guided and held. The cone surface 154 is situated at that end of the control element 148 which is situated opposite the front face 160.

It is conceivable that other constructions are also possible for the configuration of the control element 148. For example, it is also conceivable that the cone surface is arranged on the control element on the side facing toward the electromagnet 8, and the functioning of the locking unit 2 is then possibly altered. The illustrated locking unit 2 is configured such that, when the electromagnet 8 is electrically deenergized, that is to say when the winding 126 is electrically deenergized, the control element 148 forces the detent elements 10, which in the present case are in the form of balls, radially outward and thus blocks the piston 6 in the longitudinal direction L. Blocking of the movement of the piston 6 may however also take place when the electromagnet 8 is electrically energized. Here, according to the proposal, the situation of the gap 138 is also variable. In the exemplary embodiment shown in FIG. 4, the gap 138 is situated on that side of the armature 12 which is averted from the detent unit 120, that is to say between armature 12 and the magnet core 132. As an alternative to this, it is also possible that the gap is then formed between the armature and the yoke part, that is to say that side of the armature which faces toward the detent unit.

The arrangement of the magnet spring 140 in the interior space 146 is advantageous because, in this way, these elements do not impair the magnetic circuit that is formed in the elements around the armature space 130. Alternatively, an arrangement of the magnet spring in the armature space or else outside the detent unit is also possible in order to form a corresponding force accumulator. In the event of an electrical energization of the winding 126, the gap 138 closes by virtue of the armature 12 being displaced to the left, whereby the armature rod 14 and the control element 148 borne by the armature rod 14 are also displaced to the left, whereby the magnet spring 140 is compressed and thus forms a force accumulator for a resetting movement of the unit composed of armature 12, armature rod 14 and control element 148 upon ending of the electrical energization of the winding 126.

The hollow cylinder section 64 of the metal part 46 bears, at its end or end region 162 averted from the cap section 62 or yoke part 142, the one or more detent elements 10, which in the present case are in the form of balls. The detent elements 10 are provided as balls 10 in a ball cage. The sleeve-like or cylinder-like end region 162 of the hollow cylinder section 64 has detent element bores 164 which in this case are oriented radially (in relation to the longitudinal axis L) and which serve for receiving the detent elements 10 or balls. Depending on the axial setting of the control element 148, it is possible that the detent elements 10 or balls can or cannot deflect radially inward.

In the locking unit 2 that is shown, the piston 6 comprises two parts. The piston 6 comprises a piston tube 166, which partially projects out of the opening 108, and the piston thrust piece 168, which is produced separately from said piston tube. Here, the arrangement is selected such that the piston thrust piece 168, in the housing 40, adjoins the inner end of the piston tube 166 and/or can lie against said end. The piston tube 166 is completely hollow on the inside. The piston tube 166 lies with its flange ring 118, which is provided on the end side, against the piston thrust piece 168. The flange ring 118 therefore forms a radially oriented (in relation to the longitudinal axis L) boundary surface of the piston tube 166.

The piston thrust piece 168 has an annular recess 170 on its side facing the flange ring 118. The annular recess 170 corresponds to the flange ring 118, wherein the latter can enter the annular recess 170 and can lie in a floating manner against the piston thrust piece 168. They are therefore pressed against each other only on the basis of the action of force of the applied hydraulic pressure, on the one hand, and/or the force of the piston spring 114, on the other hand.

The piston tube 166 has, adjoining one another in the longitudinal direction L, a tube middle piece 94, a tube middle piece 70, and a punched and rolled section 68. The tube middle pieces 70, 94 are a deep drawn part. The punched and rolled section 68 is a punched and rolled part. It can be seen that the punched and rolled part or the punched and rolled section 68 is arranged outside the housing 40 in each of the two positions S1, S2 of the piston 6.

The tube middle piece 94 forms the flange ring 118 or bears the latter. The first tube middle piece 94 adjoins the second tube middle piece 70 at a narrowing 172 in the form of a shoulder. The diameter of the piston tube 166 is smaller in the region of the second tube middle piece 70 than in the region of the first tube middle piece 94.

Said narrowing 172 forms a stop.

The piston 6 or the piston tube 166 thereof is guided in the opening 108. If the piston 6 is displaced to the right, the movement is limited by virtue of the fact that the shoulder-like narrowing 172 lies against the shoulder 116.

In the retracted position S1 shown here, the piston 6 has been pushed into the housing 40, and only the punched and rolled section 68, which forms an end-side connecting region 174 of the piston 6, projects out of the housing 40. Further elements (not shown here) that are moved or held by the piston 6 are connected to the piston 6 for the mechanical adjustment thereof in the connecting region 174. For this purpose, the piston 6 can have, for example, a fastening bolt 176 which extends in the radial direction R and on which said elements (not shown) of the follow-up mechanism can be mounted.

As already stated, all axial sections of the piston tube 166, that is to say the first tube middle piece 94, the narrowing 172, the second tube middle piece 70, the punched and rolled section 68, and the connecting region 174, are hollow on the inside. It is to be noted that the connecting region 174 has a recess 178 provided in the longitudinal central plane, that is to say is slotted. In order to receive the fastening bolt 176 or similar, two diametrically opposite bores or other through openings 180 are provided in the punched and rolled section 68.

Figure 6:
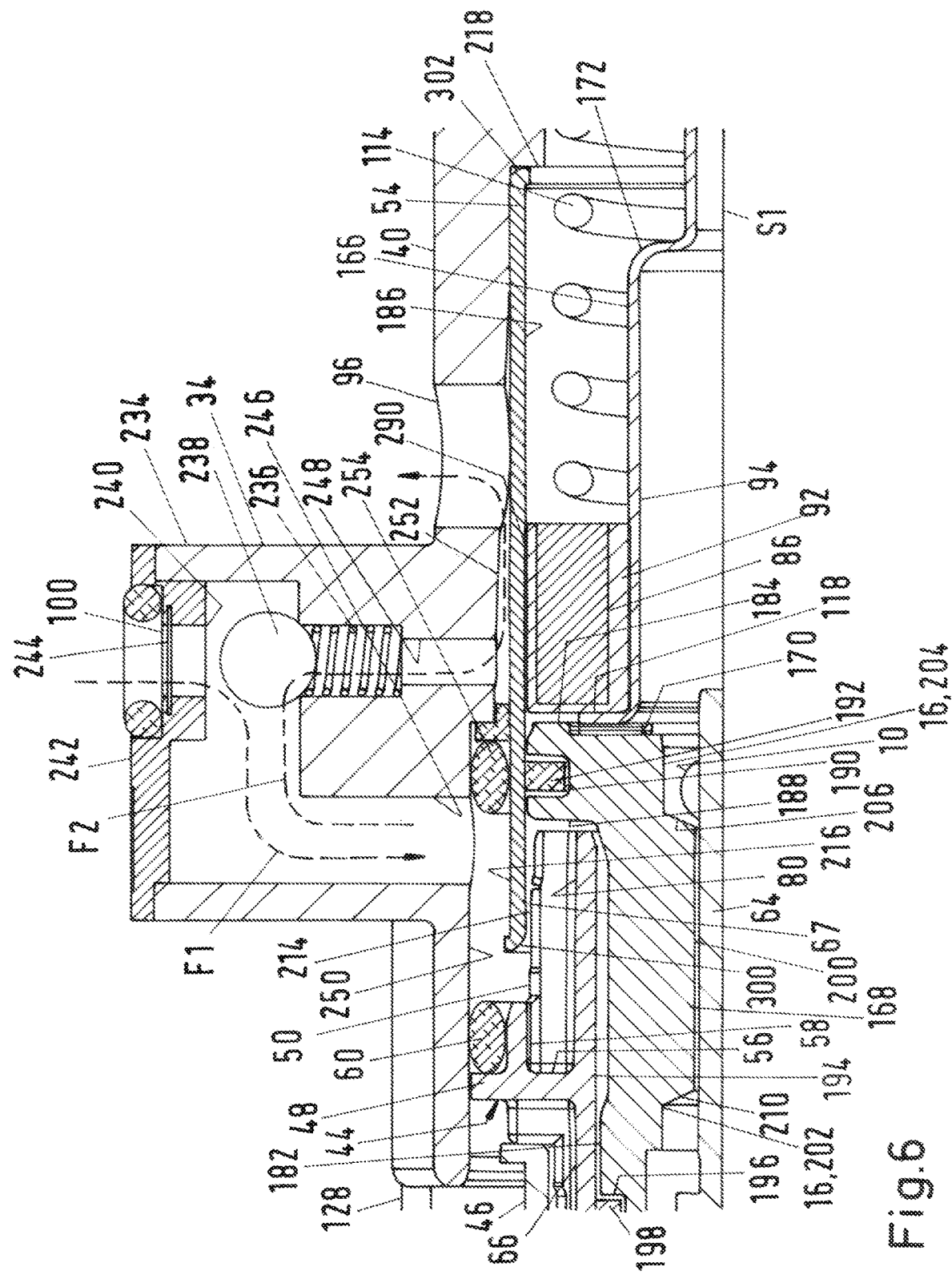
FIG. 6 shows a detail VI according to FIG. 3.

The piston thrust piece 168 is substantially sleeve-like, i.e. hollow radially on the inside, with this and the following details being illustrated in FIG. 6. The outer surface 182 or an O-ring seal 198 serves for guiding it. At the front end facing toward the piston tube 166, an outer ring 184 is provided on the piston thrust piece 168. The outer surface of said outer ring 184 or an O-ring seal 192 is mounted, or at least guided, on a tube piece inner wall 186. The outer ring 184 can lie in an axial direction (in relation to the longitudinal axis L) against the flange ring 118 of the piston tube 166. A pressure side 188, averted from the flange ring 118, of the piston thrust piece 168 or of the outer ring 184 thereof can be acted on with pressure, such as with a hydraulic pressure, and is therefore also of correspondingly solid form.

Here, an annular pressure chamber 80 is provided. The piston thrust piece 168 can be embodied as a turned part. In aspects, the piston thrust piece 168 can be formed of tool steel. Radially on the outside, the outer ring 184 has an encircling circumferential groove 190 which receives the O-ring seal 192. Since said O-ring seal 192 is subjected to the hydraulic pressure, it is also pressed in a radial direction and thus reliably closes any remaining gap between the radial outer surface of the outer ring 184 and the tube piece inner wall 186.

Furthermore, a middle piece 44 is provided which is also illustrated, sometimes in more detail, in FIGS. 6 to 9. The middle piece 44 is likewise of sleeve-like form and, at its inner side or at the inner side of the plastics part 48, forms a bearing surface 194 for the piston thrust piece 168. Here, the bearing surface 194 interacts with the lateral surface or outer surface 182 of the piston thrust piece 168 or of the O-ring seal 198 thereof. The middle piece 44 is arranged positionally fixed in the locking unit 2. The plastics part 48 and the metal part 46 are pressed together.

The outer surface 182 here can be the lateral surface of a cylinder or cylinder section. At its end averted from the piston tube 166 and facing toward the electromagnet 8, the outer surface 182 bears the O-ring seal 198 in a circumferential groove 196. Said O-ring seal 198 seals off the gap which remains between the outer surface 182 and the bearing surface 194, and which is under pressure, in the direction of the electromagnet 8. The pressure chamber 80 is therefore sealed in the longitudinal direction L between the O-ring seals 192 and 198.

The piston 6 consists of the two components, the piston tube 166 and the piston thrust piece 168, which are formed in the variants shown here in floating fashion with respect to each other, i.e. are pressed against each other only because of the action of force of the applied pressure, on the one hand, and the counter-directed force of the piston spring 114, on the other hand. Said piston 6 composed of two components is firstly mounted on the bearing surface 194 of the middle piece 44 by way of the piston thrust piece 168. A further mounting is provided at the outer ring 184 of the piston thrust piece 168 in interaction with the tube piece inner wall 186. In addition, the piston tube 166 is mounted on the tube piece inner wall 186 by a plastics carrier 92 and at the opening 108 by the tube middle piece 70.

An inner surface 200 of the piston thrust piece 168 comprises hollows or detent receptacles 202, 204 at each end side, that is to say spaced apart from one another axially (in relation to the longitudinal axis L). The diameter of the annular hollows or annular detent receptacles 202, 204 can in this case be larger than the diameter of the inner surface 200 situated between them. The detent receptacles 202, 204 are arranged on the inner surface 200 of the piston thrust piece 168 as a shoulder or internally situated shoulder. The detent unit 120 is arranged in a positionally fixed manner in the housing 40, wherein the piston 6 is configured to be movable longitudinally relative to the detent unit 120. In the retracted position S1 shown in FIGS. 4 and 6, however, the movement of the piston 6 to the right, in the direction of the opening 108, is blocked by the detent unit 120; the locking unit 2 is blocked in the retracted position of the piston 6.

The detent unit 120 comprises detent elements 10, in this case for example balls 10 of a ball cage, which are each mounted in detent element bores 164 so as to be radially movable (with respect to the longitudinal axis L). The electromagnet 8 is shown in a deenergized position, that is to say no electrical current is applied to the winding 126. Therefore, the gap 138 forms between the armature 12 and the magnet core 132, because the magnet spring 140 displaces the armature 12, and thus also the control element 148 on which the magnet spring 140 is supported, to the right. The control element 148 thus moves to the axial position of the detent elements/balls 10, such that the cone surface 154 of the control element 148 acts on the detent elements/balls 10 and pushes these radially outward (in relation to the longitudinal axis L) into the detent receptacle 204. Then, however, a longitudinal movement of the piston 6, that is to say a movement of the piston 6 to the right, is blocked, because a first inner shoulder 206 which delimits the detent receptacle 204 lies against the radially outwardly displaced detent elements 10. The detent elements 10 cannot yield in the longitudinal direction L or circumferential direction U because of the corresponding detent element bores 164 and also cannot dip away in the radial direction R because of the position of the control element 148. The first inner shoulder 206 is in this case situated at the detent receptacle 204 at the side facing toward the detent receptacle 202.

In the retracted position S1, it is furthermore the case that that end of the piston thrust piece 168 which is averted from the piston tube 166 lies against a radially running stop surface 208 of the middle piece 44, and thus also blocks a movement of the piston 6 to the left, in the direction of the electromagnet 8.

For the sake of completeness, reference should also be made at this juncture to FIG. 5 in which the position is shown at which the piston 6 has been extended to the right at a maximum distance from the housing 40, i.e. into the extended position S2. This extended position S2 is on the one hand delimited by the abutment of the narrowing 172 against the shoulder 116 in the region of the opening 108 of the housing 40. In this position, it is in turn the case that the electromagnet 8 is deactivated, that is to say no electrical current is applied to the winding 126, whereby the control element 148 pushes the detent elements/balls 10 into the detent receptacle 202 of the piston thrust piece 168 and thus on the other hand blocks a movement to the left. The radially outwardly pushed detent elements/balls 10 then lie against a second inner shoulder 210, which delimits the detent receptacle 202. The detent receptacle 204 can be a first detent receptacle; the detent receptacle 202 can be a second detent receptacle. The second inner shoulder 210 is in this case situated at that side of the detent receptacle 202 which faces toward the detent receptacle 204. As already described, the two detent receptacles 202 and 204 are spaced apart from one another axially (in relation to the longitudinal axis L).

The piston 6, in particular the piston thrust piece 168, is mounted movably between the hollow cylinder section 64, arranged radially at the inside, and the plastics part 48 of the middle piece 44, arranged radially at the outside. The middle piece 44 assumes a central position in the locking unit 2 in the embodiment shown. On the one hand, it bears the housing 40 on its radial outer side 62 and/or by a sealing ring

60. On the other hand, it however also produces a connection to the electromagnet 8, in particular to the magnet housing 128 thereof.

Furthermore, the middle piece 44 provides for radial alignment of the electromagnet 8 with respect to the detent unit 120. It is expedient to realize a high degree of concentricity in this region.

The middle piece 44 has a connecting region 214 on its side which is averted from the electromagnet 8 or which faces the piston tube 166. Said connecting region 214 is a constituent part of the middle piece 44. Here, the connecting region 214 performs multiple tasks. Firstly, it supports a tube piece 54, which can also be referred to as sleeve piece, which is a part of the housing 40 and which, on its inner side, provides a housing inner wall or a tube piece inner wall 186. Furthermore, at least a part of the connecting region 214 delimits the pressure chamber 80, that is to say is in contact with the pressurizable fluid. For this purpose, the tube piece 54 is pushed or pressed onto the connecting region 214. As already described, the piston 6, in particular the piston thrust piece 168 thereof, lies against the tube piece inner wall 186, and in this respect the tube piece 54 has the characteristics of a cylinder. The tube piece 54 delimits or conducts the fluid or the pressure of the fluid for the adjustment of the piston 6 not only at its tube piece inner wall 186 but also at its tube outer side 216. The tube piece 54 has a rounded inner circumferential edge 300 axially at one end on the inner circumferential side and a rounded outer circumferential edge 302 axially at the other end.

The mounting of the one end of the tube piece 54 on the middle piece 44 emphasizes the central importance of the middle piece 44 in the embodiment shown here. The other end of the tube piece 54 is mounted in the housing 40, and the inner side of the tube piece 54 serves as a mounting or guide of the piston 6. In the present embodiment, the tube piece 54 is, at the right-hand side, connected in fluid-tight fashion to the housing 40 in the region of a projection 218, which can also be referred to as a step.

The locking unit has a piston sensor system and a control element sensor system. The piston sensor system comprises a magnetic element 86 or piston target and two magnetic field sensors 88, 90 or piston sensors. The magnetic element 86 is insert molded by a plastics carrier 92 which is designed as a plastics ring and, on the outer circumferential side, has a supporting surface 290 which can slide along the tube piece inner wall 186 in order to support the piston 6. The plastics carrier 92 is pressed onto the piston 6 and arranged against the flange ring 118 in an axial end region of the piston tube 166. The two magnetic field sensors 88, 90 are each arranged in a fluid opening 96 and can be washed around by fluid. The control element sensor system comprises a magnetic element 292 or control element target and a magnetic field sensor 98 or control element sensor at the housing end 106. The magnetic element 292 is arranged at one end on a connecting rod 298. At the other end, the connecting rod 298 is connected fixedly and therefore longitudinally displaceably, to the control element 148.

FIG. 5 shows a perspective sectional view through the locking unit 2 of FIG. 4 in the extended position S2. It can be seen that the piston 6 has been moved out of the housing 40. This extended position S2 is again secured by the detent unit 120, as described. The detent elements 10 have been blanked out in FIG. 5.

FIG. 6 shows a detail VI according to FIG. 3, wherein the nonreturn valve 34 which is configured as a 3/2-way ball nonreturn valve can be seen here. The nonreturn valve 34 replaces the magnetic valve 36 from FIG. 2. It permits a fluid flow into the locking unit 2, this being indicated by fluid path F1. However, it prevents a fluid flow out of the locking unit 2 at this point, as visualized by fluid path F2. This prevents air from being admitted into the hydraulic system and frothing. The open position of the nonreturn valve 34 is shown in FIG. 6. The nonreturn valve 34 comprises a valve housing 234 which is formed integrally with the housing 40 of the locking unit 2. It also comprises a valve closing spring 236 and a ball or closing ball 238 as the closing element. The valve closing spring 236 pretensions the closing ball 238 into a closing position against a sealing seat 240. The closing ball 238 can be guided on its adjustment path between its positions. The sealing seat 240 is formed by a valve cover 242 which forms the valve inlet 100 and has a filter element 244. The valve cover 242 is fixedly connected to the valve housing 234. The valve housing 234 has a first channel 246 which leads from the valve inlet 100 to a pressure-conducting channel 250 in the housing 40. The pressure-conducting channel 250 is formed between the inner wall of the housing 40 and the tube outer side 216. From there, the tube piece 54 is washed around along F1, and the fluid passes into the pressure chamber 80. If the fluid is pushed out of the pressure chamber 80, it follows fluid path F2, with the nonreturn valve 34 then being closed (not illustrated). The fluid path 2 then extends through the first channel 246 into a second channel 248 in which the valve closing spring 236 is also arranged. By an outlet channel 252 between the inner wall of the housing 40 and the tube outer side 216, the fluid passes out of the housing 40 through a fluid opening 96. A sealing ring 254 separates the pressure-conducting channel 250 and outlet channel 252 fluidically from one another.

Figure 7:
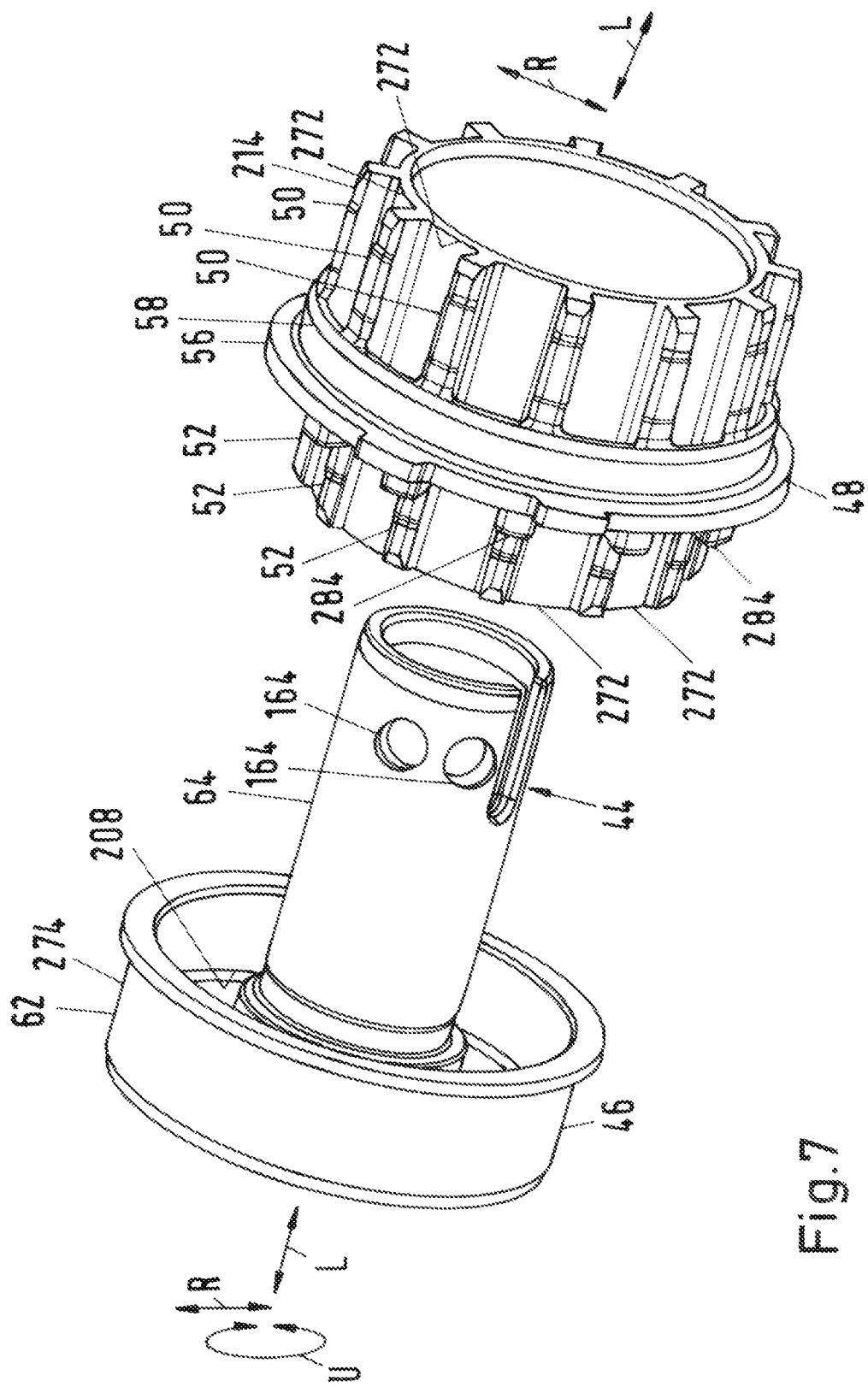
FIG. 7 shows an exploded view of a middle piece.

FIG. 7 shows an exploded view of a middle piece 44.

The two-part design of the middle piece 44 can be clearly seen. The plastics part 48 forms support segments 50, 52 which run in the longitudinal direction L on the outer circumferential side, are equidistant in the circumferential direction U and extend in the radial direction R and bear the tube piece 54 and the metal part 46, as FIGS. 8 and 9 also show. The region between the plastics part 48 and the metal part 46 is a connecting region 286, and the region between the plastics part 48 and the tube piece 54 is likewise a connecting region 288. The connecting regions 286, 288 are each designed as a crown ring. Segment intermediate spaces 272 which run in the longitudinal direction L and are formed between adjacent support segments 50, 52 are formed in each connecting region 286, 288.

Figure 8:
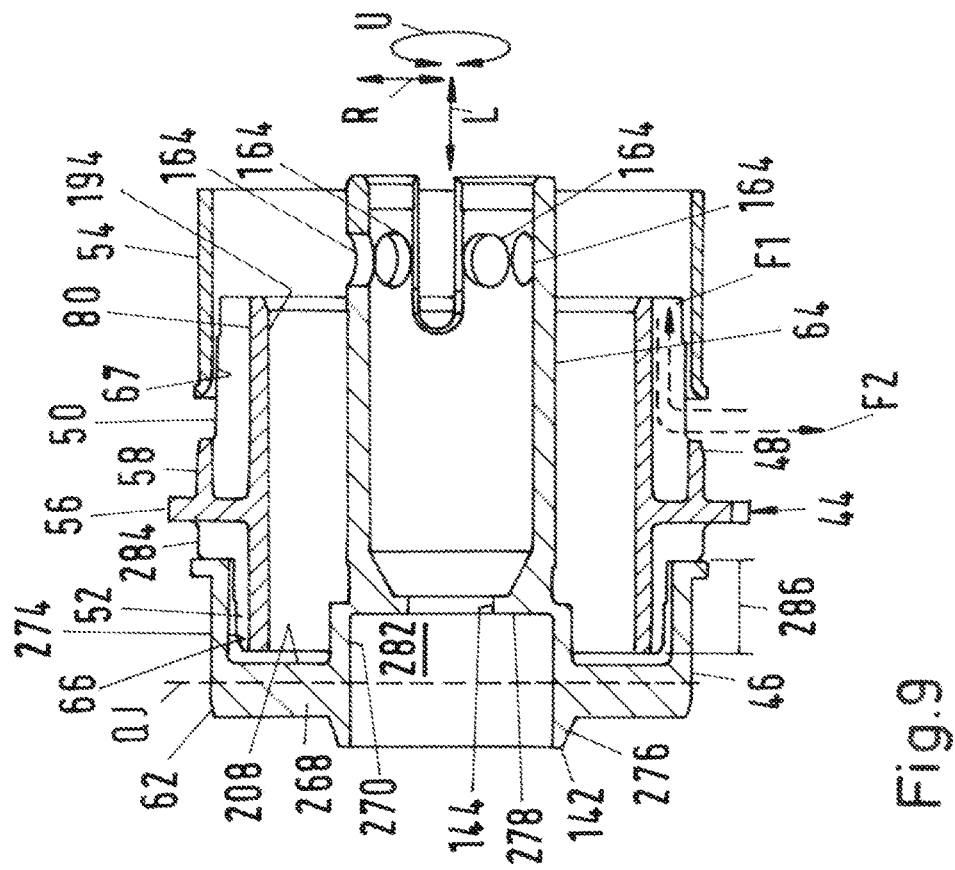
FIG. 8 shows a first sectional view of a middle piece.
Figure 9:
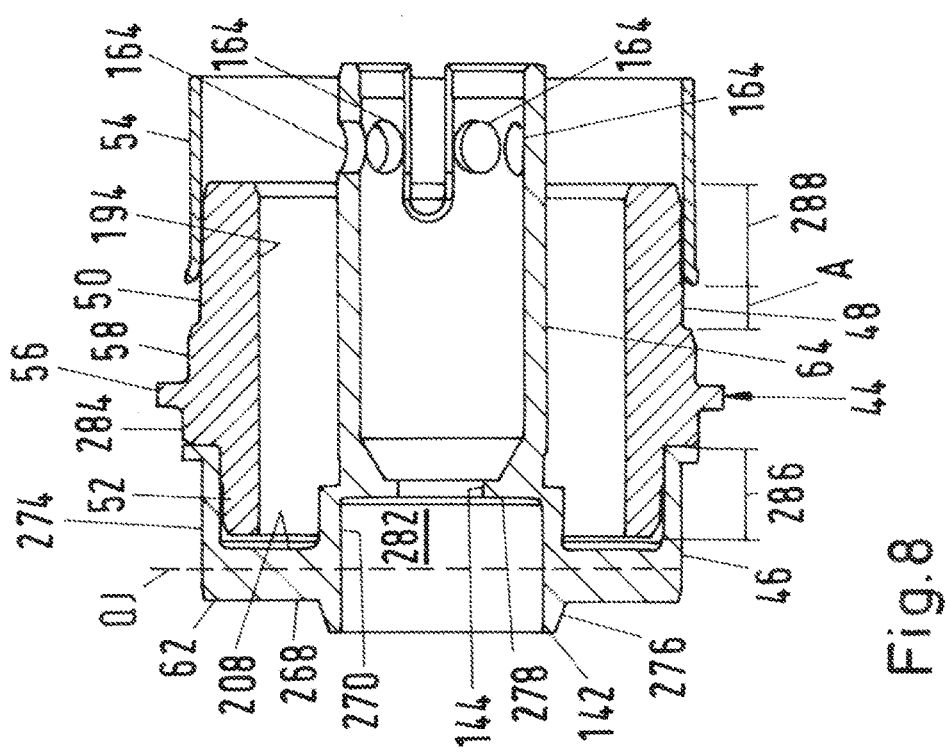
FIG. 9 shows a second sectional view of a middle piece.

FIG. 8 shows a first sectional view of a middle piece 44 through a support segment 50, 52, FIG. 9 likewise showing a sectional view of the middle piece 44, but this time through a segment intermediate space 272.

The metal part 46 has a cap section 62 and a hollow cylinder section 64 extending in the longitudinal direction L. The cap section 62 covers the plastics part 48 on the front face. In addition, the metal part 48 lies against the electromagnet 8 or the coil body 124 thereof. The cap section 62 forms the yoke part 142 which itself is part of the magnetic circuit. The armature space 130 of the electromagnet 8 is simply delimited by the cap section 62 or the yoke part 142, which can be of pot-like configuration. An arrangement can be selected here such that part of the armature 12 can enter the yoke part 142.

The cap section 62 forms a stop surface 208 for the piston thrust piece 168 of the piston 6. The cap section 62 has a front section from which a pot wall section 270 protrudes at a right angle radially on the inner circumferential side and a circumferential wall section 274 protrudes at a right angle radially on the outer circumferential side. On the circumferential side, the pot wall section 270 delimits a pot base section 278 which is connected thereto. The pot wall section 270 and pot base section 278 form a pot-like receiving space 282 for the armature 12. The metal part 46 has a magnetic cone ring 276 protruding in the longitudinal direction L so as to face the electromagnet 8. The front section of the cap section 62 has a material thickness in the longitudinal direction L that is at least twice as large as the material thickness of the adjoining pot wall section 270 in the radial direction R. In addition, a transverse central plane QJ of the yoke part 142 or of the pot-like receiving space 282 extends through the front section.

The hollow cylinder section 64 extends from the pot base section 278. The hollow cylinder section has the detent element bores 164 for receiving the detent elements 10. The hollow cylinder section 64 can therefore form a ball cage. The metal part 46 has, in the pot base section 278, a through bore 144 through which the armature 12 or the armature rod 14 projects and is mounted. It can also be seen that the metal part 46 guides the armature 12 in each of its positions.

The plastics part 48 has, on the outer circumferential side, a supporting flange 56 projecting in the radial direction R. Starting from the supporting flange 56, the support segments 50 extend to one side in the longitudinal direction L and the support segments 52 extend to the other side in the longitudinal direction L. The supporting flange protrudes over the support segments 50, 52 in the radial direction R and centers the middle piece 44 in relation to the housing 40. In addition, the plastics part 48 has, on the outer circumferential side, a carrier flange 58 which projects in the longitudinal direction L and bears a sealing ring 60. The carrier flange 58 is formed integrally with the supporting flange 56 and is supported in the radial direction R on the support segments 50; they fit behind the carrier flange 58.

It can be seen with reference to FIG. 9 that the metal part 46 together with the plastics part 48 forms first channels 66 lying in between them. The first channels 66 lead to a compensating space 280, denoted in FIG. 4. The compensating space 280 can be produced by longitudinal displacement of the piston 6. The first channel 66 is used for pressure compensation. The plastics part 48 together with the tube piece 54 forms second channels 67 lying in between them. The second channels 67 lead to the pressure chamber 80. The segment intermediate spaces 272 are therefore designed as a fluidic connection. The first and second channels 66, 67 are channels 66, 67 that are formed by the plastics part 48 and are separated from one another. A respective channel 66, 67 is therefore formed between support segments 50, 52, which are adjacent in the circumferential direction U, the plastics part 48 radially on the inside and the metal part 46 or the tube piece 54 on the opposite radial side, i.e. radially on the outside, It can also be seen that the supporting flange 56 separates these two channels 66, 67 fluid-tightly and pressure-tightly, with the supporting flange 56 expediently being configured without apertures in the longitudinal direction L. The support segments 52 each form a longitudinal stop 284 for the metal part 46, with the respective longitudinal stops 284 extending in the radial direction R and protruding over the respective support segment 52 in the radial direction R. A longitudinal distance A, as shown in FIG. 8, is provided between the tube piece 54, on the one hand, and the carrier flange 58, on the other hand.

Figure 10:
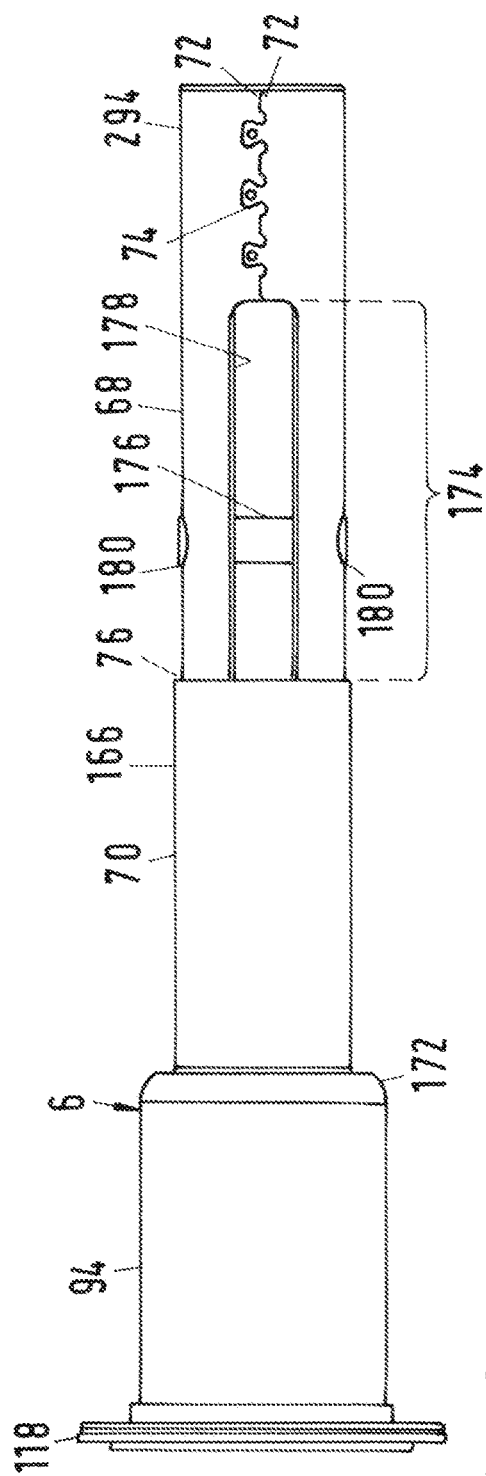
FIG. 10 shows a side view of a piston.

FIG. 10 shows a side view of a piston 6, with the diametrically opposite recesses 178 being seen here. The recesses 178 are designed as elongated holes. Diametrically opposite through openings 180 in which the fastening bolt 176 is held can also be seen. The recesses 178 and the fastening bolt 176 are expediently aligned with one another in the radial direction R. The punched and rolled section 68 is hard brazed or welded to the piston 6 or to a tube middle piece 70 of the piston 6, with a weld seam 76 being shown by way of example. The two interconnected edges 72 of the punched and rolled section 68 form a form fit with each other, the latter being configured here as a puzzle closure 74. The puzzle-shaped edges 72 have form-fitting geometries for this purpose.

Figure 11:
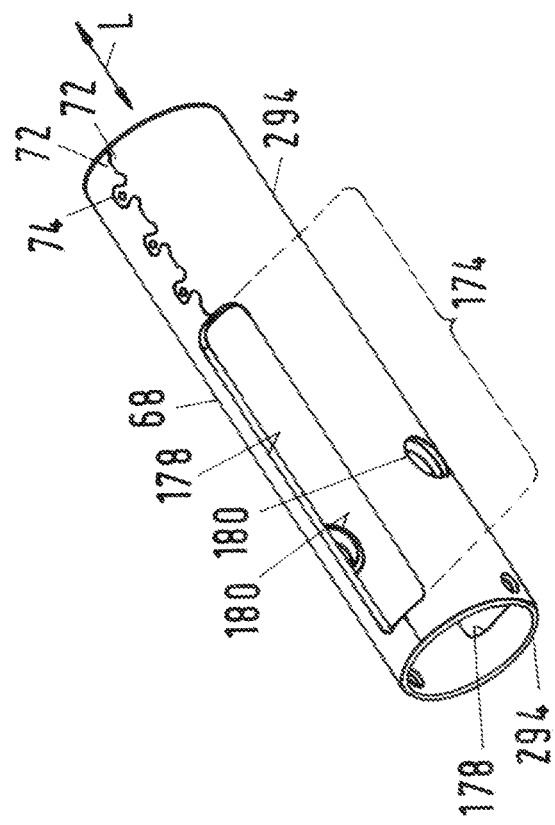
FIG. 11 shows a perspective view of a punched and rolled section of a piston.

FIG. 11 shows a perspective view of a punched and rolled section of a piston 6 from FIG. 10, with it being seen that the recesses 178 are enclosed on both sides in the longitudinal direction L by an annular section 294 of the punched and rolled part or punched and rolled section 68. As a result, a more stable design can be achieved than with an open fork head which has a recess which is open on one side. The punched and rolled part or punched and rolled section 68 is designed as a hollow cylinder with a constant diameter over its longitudinal extent.

Figure 12:
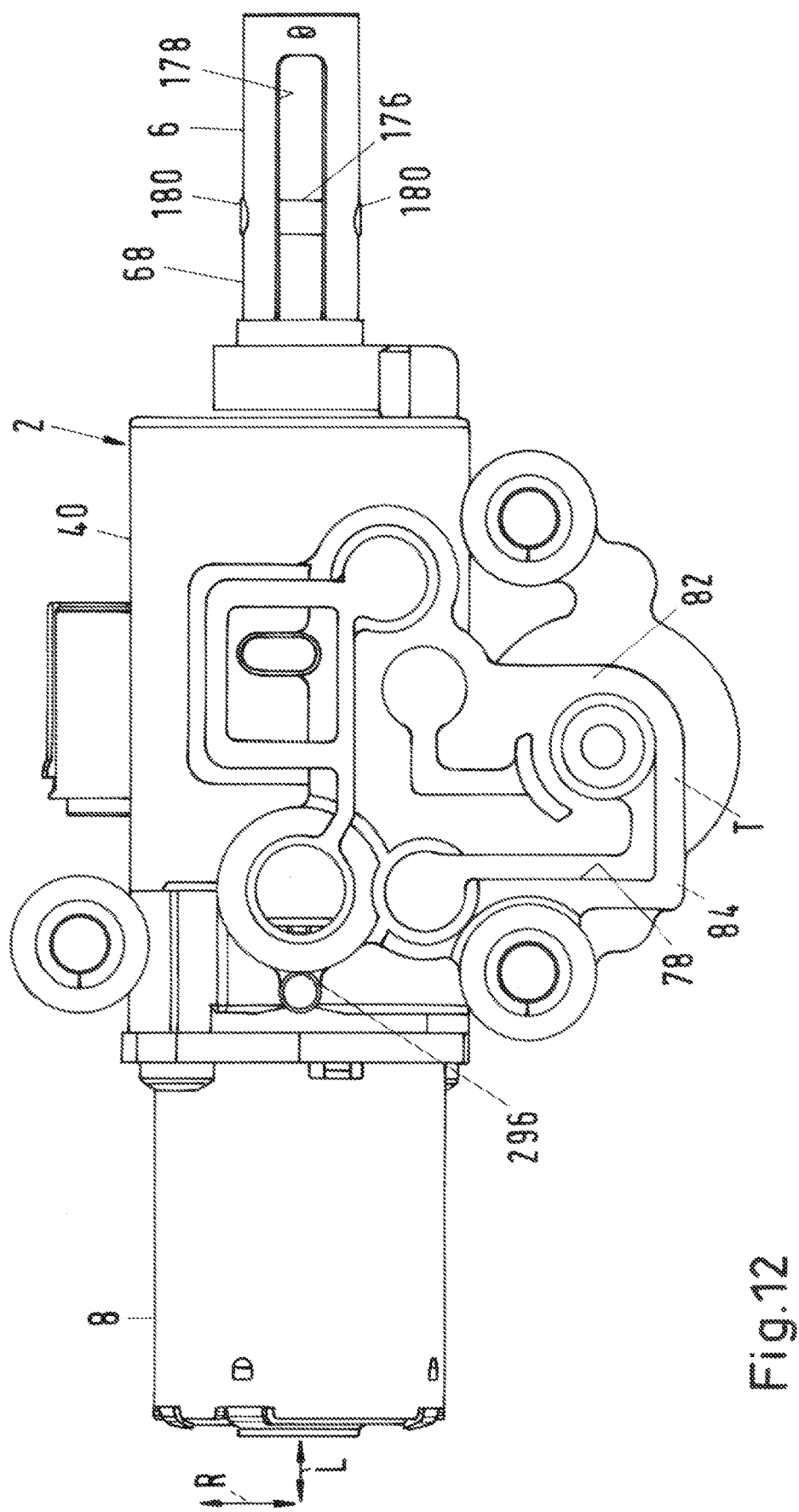
FIG. 12 shows a perspective view of a locking unit.

FIG. 12 shows a perspective view of a locking unit, the housing 40 forming a meandering fluid channel 78. The meandering fluid channel 78 is fluidically connected to the pressure chamber 80 and basically serves for conducting fluid into the locking unit 2. The meandering fluid channel 78 extends along a housing side 82, the housing 40 having a separating plane T in which a meandering seal 84 is arranged. A cover which covers the meandering fluid channel 78 and the meandering seal 84 can be screwed down at bores 296. However, the cover has been blanked out in order to visualize the fluid channel 78. However, it has a fluid opening which leads into the meandering fluid channel 78.

A method for operating the locking arrangement 1 or the locking unit 2 can provide at least the following steps:
  determining that the piston 6 of the locking unit 2 is intended to be adjusted from its retracted position S1 or its extended position S2 into the respective other of the two positions S1, S2 (target position),
  determining in which operating direction the pump 28 of the coolant circuit 30 is operated, wherein
    when a suction mode of the pump 28 is determined, the operating direction of the pump 28 is adjusted into the pressure mode, or
    when a pressure mode of the pump 28 is determined, the operating direction of the pump 28 is retained in the pressure mode,
  pressurizing the piston 6 by a hydraulic fluid conveyed by the pump, determining that the piston 6 has reached the target position,
  when the suction mode is determined in b): adjusting the pump 28 again into the suction mode.

The disclosed locking unit is not restricted to any one of the above-described embodiments, but may be modified in a variety of ways. All of the features and advantages that emerge from the claims, from the description and from the drawing, including structural details, spatial arrangements and method steps, may be essential to the invention both individually and in a wide variety of combinations.

The invention encompasses all combinations of at least two features disclosed in the description, the claims and/or the figures.

To avoid repetitions, it is the intention that features disclosed in device terms are also disclosed, and capable of being claimed, in method terms. It is likewise the intention that features disclosed in method terms are disclosed, and capable of being claimed, in device terms.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A locking unit for locking a movement of a piston which can be acted on with pressure of a fluid, the locking unit comprising:
   the piston;
   an electromagnet;
   at least one detent element;
   a housing; and
   a pressure the housing is configured to form a me ing fluid channel which is fluidically c ecte d to the pressure chamber, wherein the housing has a cover whic ers the meandering fluid channel and has a fluid o pening ch opens into the me de a fluid channel,
   wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is designed at least in sections as a hollow part.

2. The locking unit as claimed in claim 1, wherein the piston is designed in sections as a punched and rolled part.

3. The locking unit as claimed in claim 2, wherein the punched and rolled part is hard brazed or welded on the piston or on a tube middle piece of the piston.

4. The locking unit as claimed in claim 2, wherein interconnected edges of the punched and rolled part have a puzzle closure.

5. The locking unit as claimed in claim 1, wherein the meandering fluid channel extends on or along a housing side of the housing of the locking unit.

6. The locking unit as claimed in claim 1, wherein the housing has a separating plane in which the meandering fluid channel is arranged.

7. The locking unit as claimed in claim 6, further comprising a meandering seal arranged in the separating plane.

8. The locking unit as claimed in claim 1, further comprising:
   a magnetic element connected to the piston; and
   at least one magnetic field sensor for sensing a magnetic field of the magnetic element, wherein the at least one magnetic field sensor is arranged on or in the housing.

9. The locking unit as claimed in claim 8, further comprising a plastics carrier, wherein the magnetic element is surrounded by a plastics carrier.

10. The locking unit as claimed in claim 8, wherein the magnetic element is arranged on an outer circumferential side of the piston.

11. The locking unit as claimed in claim 10, wherein the magnetic element is arranged on a tube middle piece of the piston.

12. The locking unit of as claimed in claim 11, wherein the magnetic element is arranged in an axial end region of the piston.

13. The locking unit as claimed in claim 8, wherein the at least one magnetic field sensor is arranged in the fluid opening of the housing.

14. The locking unit as claimed in claim 8, further comprising a leadframe configured to carry the at least one magnetic field sensor.

15. The locking unit as claimed in claim 14, wherein the leadframe is surrounded by a plastic.

16. The locking unit as claimed in claim 1, further comprising:
   an electrical module housing which is separate from, and fastened to the housing, wherein the electrical module housing has an electronic interface which is a sole electronic interface of the locking unit.

17. The locking unit as claimed in claim 1, further comprising a BUS system, wherein the BUS system is connected to one or more of a solenoid valve, the electromagnet, and a magnetic field sensor.

18. A locking unit for locking a movement of a piston which can be acted on with pressure of a fluid, the locking unit comprising:
   the piston;
   an electromagnet;
   at least one detent element;
   a housing;
   a magnetic element connected to the piston; and
   at least one magnetic field sensor for sensing a magnetic field of the magnetic element,
   wherein the at least one magnetic field sensor is arranged on or in the housing,
   wherein the housing comprises a fluid opening, wherein the at least one magnetic field sensor is arranged in the fluid opening of the housing,
   wherein the at least one detent element interacts with an armature or an armature rod of the electromagnet, wherein the piston has at least one detent receptacle, wherein the piston can be secured by a retaining interaction of the at least one detent element with the at least one detent receptacle, wherein the piston is adjustable between a retracted position and an extended position, wherein the piston is designed at least in sections as a hollow part.

* * * * *